United States Patent
Hirako

(10) Patent No.: US 9,283,915 B2
(45) Date of Patent: Mar. 15, 2016

(54) AIR BELT DEVICE

(71) Applicant: TOYOTA JIDOSHA KABUSHIKI KAISHA, Toyota-shi, Aichi-ken (JP)

(72) Inventor: Yutaka Hirako, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/451,733

(22) Filed: Aug. 5, 2014

(65) Prior Publication Data

US 2015/0054264 A1    Feb. 26, 2015

(30) Foreign Application Priority Data

Aug. 21, 2013    (JP) ................................. 2013-171422

(51) Int. Cl.
| | | |
|---|---|---|
| *B60R 21/231* | (2011.01) | |
| *B60R 21/18* | (2006.01) | |
| *B60R 21/00* | (2006.01) | |
| *B60R 21/2338* | (2011.01) | |

(52) U.S. Cl.
CPC ............... *B60R 21/231* (2013.01); *B60R 21/18* (2013.01); *B60R 2021/0048* (2013.01); *B60R 2021/23382* (2013.01)

(58) Field of Classification Search
CPC ...... B60R 21/18; B60R 21/23; B60R 21/231; B60R 21/2338; B60R 2021/23382
See application file for complete search history.

(56) References Cited

U.S. PATENT DOCUMENTS

| | | | | |
|---|---|---|---|---|
| 3,866,940 | A * | 2/1975 | Lewis | 280/733 |
| 5,445,411 | A | 8/1995 | Kamiyama et al. | |
| 5,924,722 | A * | 7/1999 | Koide et al. | 280/730.2 |
| 5,947,513 | A * | 9/1999 | Lehto | 280/733 |
| 6,460,881 | B1 * | 10/2002 | Adomeit | 280/733 |
| 7,665,761 | B1 * | 2/2010 | Green et al. | 280/733 |
| 7,766,382 | B2 * | 8/2010 | Murakami | 280/733 |
| 8,104,790 | B2 * | 1/2012 | Nezaki | 280/733 |
| 2004/0164532 | A1 * | 8/2004 | Heidorn et al. | 280/733 |
| 2005/0230945 | A1 * | 10/2005 | Watanabe | 280/733 |
| 2006/0028004 | A1 * | 2/2006 | Oota et al. | 280/733 |
| 2006/0290114 | A1 | 12/2006 | Suyama | |
| 2007/0102909 | A1 * | 5/2007 | Nezaki et al. | 280/733 |
| 2007/0102910 | A1 * | 5/2007 | Nezaki et al. | 280/733 |
| 2009/0033077 | A1 | 2/2009 | Yamataki | |
| 2009/0051150 | A1 * | 2/2009 | Murakami | 280/733 |
| 2009/0179406 | A1 | 7/2009 | Haraoka et al. | |
| 2009/0236828 | A1 * | 9/2009 | Foubert et al. | 280/728.2 |
| 2009/0322067 | A1 * | 12/2009 | Nezaki | 280/807 |
| 2010/0164207 | A1 * | 7/2010 | Sekizuka et al. | 280/733 |
| 2010/0164215 | A1 * | 7/2010 | Nezaki | 280/808 |

(Continued)

FOREIGN PATENT DOCUMENTS

| | | |
|---|---|---|
| JP | A-5-112201 | 5/1993 |
| JP | A-2000-25546 | 1/2000 |

(Continued)

*Primary Examiner* — Barry Gooden, Jr.
(74) *Attorney, Agent, or Firm* — Oliff PLC

(57) ABSTRACT

An air belt device includes a shoulder belt section that is worn from a shoulder on one side in a seat width direction to a lumbar on another side in the seat width direction of a passenger, who is seated on a seat. The shoulder belt section includes an inflation section that is inflated by a supply of gas and in which a portion on a head side of the passenger with respect to a center section in a width direction of the shoulder belt section is deployed to be larger than a portion on an opposite side from the head side.

13 Claims, 5 Drawing Sheets

(56) References Cited

U.S. PATENT DOCUMENTS

| | | | |
|---|---|---|---|
| 2011/0006507 A1* | 1/2011 | Fukawatase et al. | 280/733 |
| 2011/0006508 A1* | 1/2011 | Nezaki | 280/733 |
| 2012/0101688 A1* | 4/2012 | Sugiyama et al. | 701/45 |
| 2012/0169034 A1* | 7/2012 | Yamataki | 280/733 |
| 2013/0264803 A1* | 10/2013 | Schneider et al. | 280/733 |
| 2014/0265277 A1* | 9/2014 | Takashi | B60R 21/23138 280/743.1 |

FOREIGN PATENT DOCUMENTS

| | | |
|---|---|---|
| JP | 2000-108832 A | 4/2000 |
| JP | 2007-008220 A | 1/2007 |
| JP | A-2007-125937 | 5/2007 |
| JP | 2007-137225 A | 6/2007 |
| JP | 2009-035176 A | 2/2009 |
| JP | A-2009-166569 | 7/2009 |
| JP | A-2010-120410 | 6/2010 |

* cited by examiner

AIR BELT DEVICE

INCORPORATION BY REFERENCE

The disclosure of Japanese Patent Application No. 2013-171422 filed on Aug. 21, 2013 including the specification, drawings and abstract is incorporated herein by reference in its entirety.

BACKGROUND OF THE INVENTION

1. Field of the Invention

The present invention relates to an air belt device.

2. Description of Related Art

A three-point seat belt device in which a shoulder belt section that is worn from a shoulder of a passenger, who is seated on a vehicle seat, to a lumbar on an opposite side in a seat width direction is provided with an inflation section (a bag) that is inflated by a supply of gas has been known (see Japanese Patent Application Publication No. 5-112201 (JP 5-112201 A) and Japanese Patent Application Publication No. 2000-25546 (JP 2000-25546 A), for example).

In each of above configurations, the inflation, section is symmetrically folded with respect to the center in a width direction of the shoulder belt section. Thus, in order to effectively protect a head of the passenger by the inflation section that has been inflated and deployed, a volume of the inflation section needs to be increased.

SUMMARY OF THE INVENTION

The present invention provides an air belt device that can secure protection performance of a head of a passenger while suppressing a volume of an inflation section from being increased.

A first aspect of the present invention relates to an air belt device. The air belt device includes a shoulder belt section that is worn from a shoulder on one side in a seat width direction to a lumbar on another side in the seat width direction of a passenger who is seated on a seat. The shoulder belt section includes an inflation section that is inflated by a supply of gas and in which a portion on a head side of the passenger with respect to a center section in a width direction of the shoulder belt section is deployed to be larger than a portion on an opposite side from the head side.

In this air belt device, the shoulder belt section is obliquely worn from the shoulder on the one side in the seat width direction to the lumbar on another side in the seat width direction of the passenger. When the gas is supplied to the inflation section of this shoulder belt section, the inflation section is inflated and deployed. Since this inflation section restricts movement of the head of the passenger, the head of the passenger is protected.

Here, the portion of the inflation section on the head side of the passenger with respect to the center section in the width direction (a center line in a longitudinal direction) of the shoulder belt section is deployed to be larger than the portion on the opposite side from the head side (hereinafter referred to as a "head opposite side"). In other words, the inflation section is deployed such that it is offset to the head side in the width direction with respect to the center section in the width direction of the shoulder belt section before the inflation and deployment of the inflation section. Thus, compared to a configuration that includes an inflation section in which a portion to be deployed to the head opposite side is inflated and deployed in the same manner as a portion to be deployed to the head side that obtains protection performance of the head of the passenger described above, a volume of the inflation section in this air belt device is suppressed to be small.

As described above, in the above aspect, it is possible to secure the protection performance of the head of the passenger while suppressing the volume of the inflation section from being increased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will be made on a three-point air belt device 10 as an air belt device according to a first embodiment of the present invention on the basis of FIG. 1 to FIG. 3. It should be noted that an arrow UP and an arrow OUT that are appropriately shown in the each drawing respectively indicate an upper direction and an outer side in a vehicle width direction of a vehicle V to which the air belt device 10 is applied. These directions substantially correspond to an upper direction and one side (a left side) in a seat width direction of a vehicle seat 11 to which the air belt device 10 is applied, respectively. In a case where a description will be made below by using front/rear and up/down directions, these directions respectively indicate front/rear of a vehicle front/rear direction and up/down of a vehicle up/down direction unless otherwise specified.

The air belt device 10 is configured such that a seat belt 12 of a three-point seat belt device is added with (a function of) an inflation section 24 that is inflated and deployed by a supply of gas. First, a description will be made on a basic configuration as the three-point seat belt device. Then, a description will be made on a configuration as the air belt device that includes the inflation section 24 (an air belt section).

(Configuration As a Three-Point Seat Belt Device)

Figure 2:
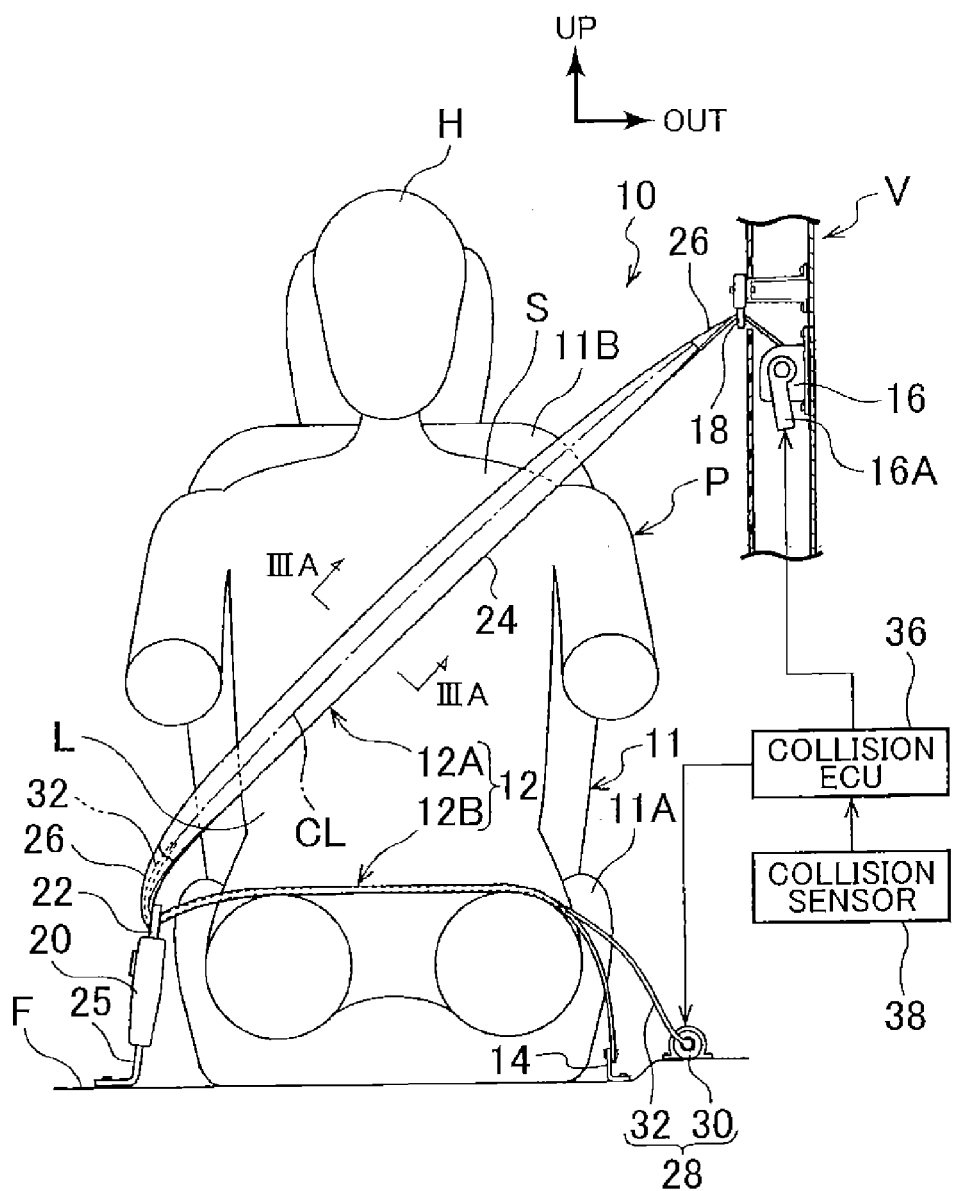
FIG. 2 is a front view that schematically shows a state that a seat belt in the air belt device according to the first embodiment of the present invention is worn on a passenger.

FIG. 2 shows a front view of a state of use (worn state) of the air belt device 10 that is applied to the vehicle seat 11 as a seat. Here, the vehicle seat 11 in this embodiment is adopted as a rear seat in a two-row seat layout or a second-row or third-row seat in a three-row seat layout. As shown in FIG. 2, the air belt device 10 is configured by including the seat belt 12, an anchor plate 14, a retractor 16, a shoulder anchor 18, a buckle 20, and a tongue plate 22.

The seat belt 12 as a whole has a strip shape in a folded state of the inflation section 24, which will be described below, an end in a longitudinal direction is coupled to the anchor plate 14, and another end in the longitudinal direction is retracted by the retractor 16 in a manner capable of being pulled out. In addition, in the retractor 16 in this embodiment, a pretensioner mechanism 16A that is actuated to forcibly retract the seat belt 12 by a specified quantity is mounted.

In this embodiment, the anchor plate 14 is fixed to a floor F of the vehicle V on the outer side in the vehicle width direction with respect to a rear portion of a seat cushion 11A of the vehicle seat 11. In addition, the retractor 16 is fixed to a body shell (panel) on the outer side in the vehicle width direction with respect to a seat back 11B of the vehicle seat 11. Here, the anchor plate 14 may be fixed to a frame of the seat cushion 11A, and the retractor 16 may be fixed to a frame of the seat back 11B. In addition to or instead of the pretensioner mechanism 16A, the pretensioner mechanism may be provided on the buckle 20 side, for example.

The buckle 20 is fixed to the floor F of the vehicle V via an inner belt 25 on an inner side in the vehicle width direction with respect to the rear portion of the seat cushion 11A. The buckle 20 may be fixed to the frame of the seat cushion 11A. This buckle 20 can engage and disengage the tongue plate 22 through which the seat belt 12 is inserted to be slidable in the longitudinal direction of the seat belt 12. Then, as shown in FIG. 2, it is configured that the seat belt 12 is worn on a passenger P who is seated on the vehicle seat 11 by engaging the tongue plate 22 with the buckle 20.

In this worn state, a portion of the seat belt 12 that is from the shoulder anchor 18 to the buckle 20 is a shoulder belt section 12A, and a portion of the seat belt 12 that is from the buckle 20 to the anchor plate 14 is a lap belt section 12B. The shoulder belt section 12A is worn obliquely from a shoulder S on the outer side in the vehicle width direction of the passenger P to a lumbar L on the inner side in the vehicle width direction from a front, so as to restrain an upper body of the passenger P to the vehicle seat 11 (the seat back 11B). The lap belt section 12B is worn on the lumbar L of the passenger P from the front and above, so as to restrain the lumbar L of the passenger P to the vehicle seat 11.

Accordingly, the air belt device 10 is configured to function as a general three-point seat belt device in normal use (in non-collision).

(Configuration As an Air Belt Device)

Figure 1:
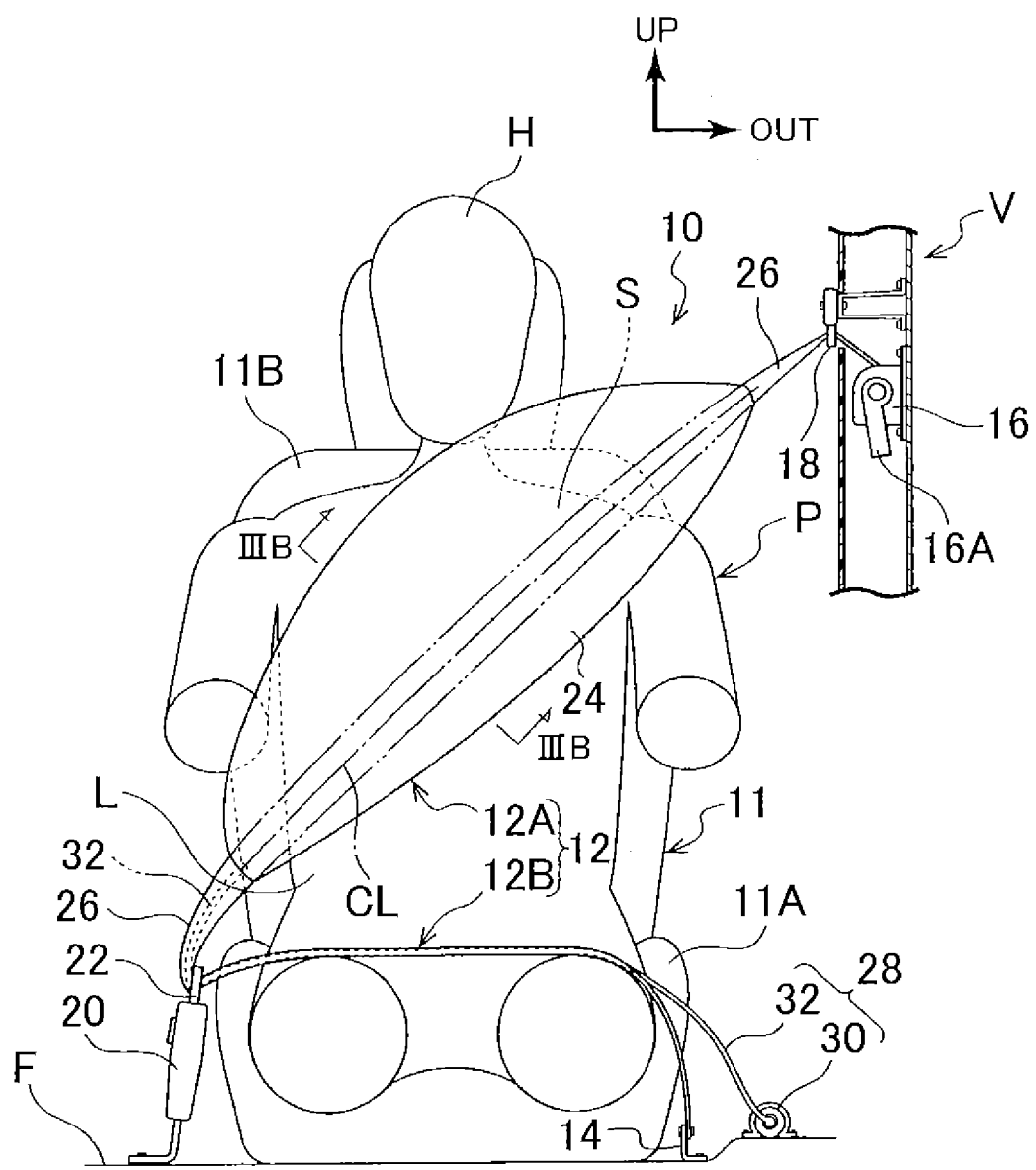
FIG. 1 is a front view that schematically shows a state that an inflation section in an air belt device according to a first embodiment of the present invention is deployed.
Figure 3A:
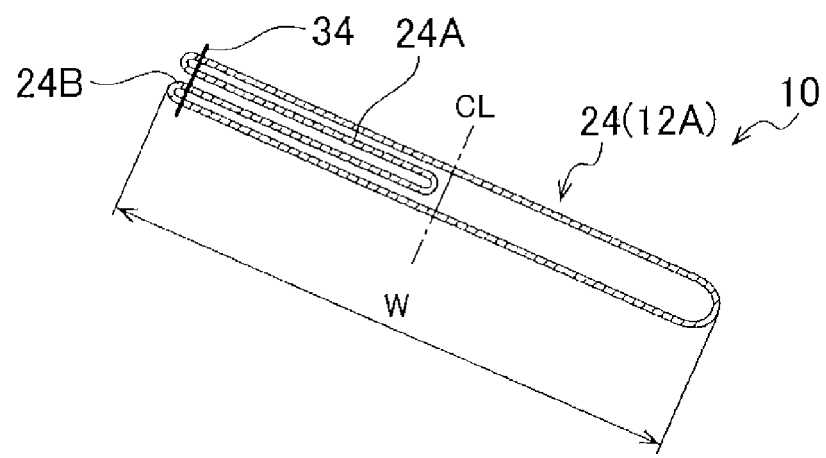
FIG. 3A is a view that shows the inflation section that constitutes the air belt device according to the first embodiment of the present invention, and is an enlarged cross-sectional view that is taken along the line IIIA-IIIA in FIG. 2.

In the configuration that has been described above, the portion in the seat belt 12 that constitutes the shoulder belt section 12A is provided with the inflation section 24, as shown in FIG. 1 and FIG. 2. In a cross-sectional view that is orthogonal to the longitudinal direction of the shoulder belt section 12A, the inflation section 24 is folded in a manner that is shown in FIG. 3A, and is configured as a bag that is inflated by the supply of gas. As shown in FIG. 1 and FIG. 2, both ends in the longitudinal direction of the inflation section 24 are each joined to a webbing 26 that constitutes a general section (a portion that is not inflated) of the seat belt 12. In other words, in this embodiment, the inflation section 24 constitutes a portion in the longitudinal direction of the shoulder belt section 12A. A folded shape of this inflation section 24 will be described below.

Meanwhile, the air belt device 10 includes a gas supply device 28 that supplies gas to the inflation section 24. The gas supply device 28 is configured by including an inflator 30 that is actuated to produce gas and a flexible hose (tube) 32 that guides the gas produced by the inflator 30 to the inflation section 24. In this embodiment, a combustion inflator or a cold gas inflator is adopted as the inflator 30, and the inflator 30 is fixed to the floor F in the vicinity of the anchor plate 14. The flexible hose 32 is supported from the inflator 30 by a portion in the seat belt 12 that mainly constitutes the lap belt section 12B, and a tip thereof is inserted in the inflation section 24.

Accordingly, once the inflator 30 is actuated, the gas that is produced by the inflator 30 is introduced (flows) into the inflation section 24 through the flexible hose 32, and the inflation section 24 is thereby inflated and deployed.

Figure 3B:
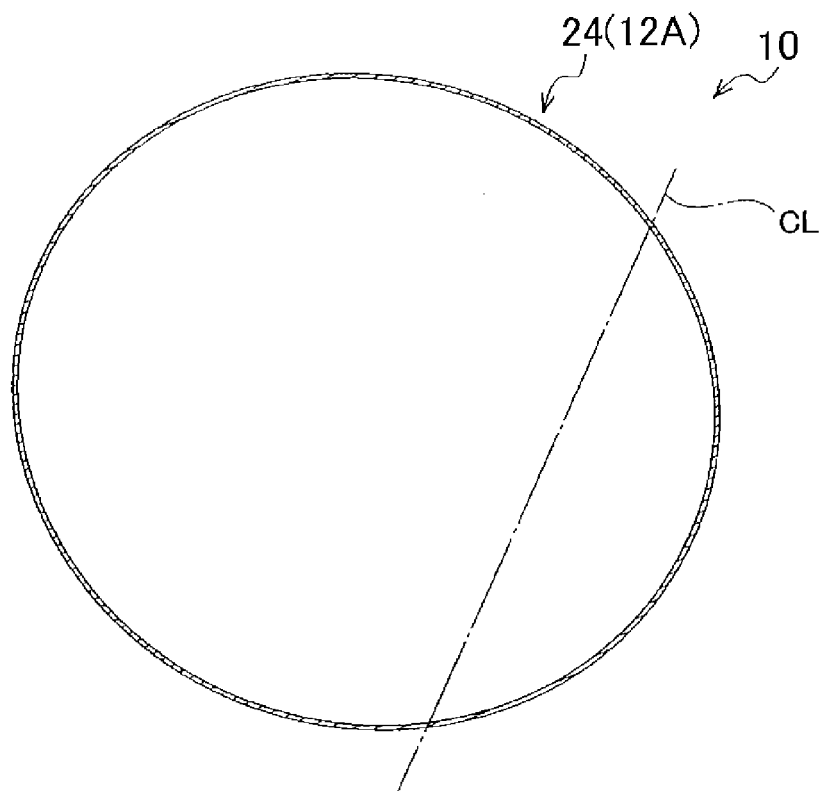
FIG. 3B is a view that shows the inflation section that constitutes the air belt device according to the first embodiment of the present invention, and is an enlarged cross-sectional view that is taken along the line IIIB-IIIB in FIG. 1.

As shown in FIG. 1 and FIG. 3B, the inflation section 24 is configured to be inflated by the supply of the gas and deployed to be larger on a head H side of the passenger P than an opposite side of the head H (hereinafter referred to as a "head opposite side") with respect to a center line CL that passes through a center section in a width direction of the shoulder belt section 12A. In other words, the inflation section 24 is configured to be inflated and deployed asymmetrically such that it is offset to the head H side with respect to the center line CL. It should be noted that the center line CL is shown in FIG. 1 and FIG. 2 as a center line that follows the longitudinal direction of the shoulder belt section 12A and is also shown in FIG. 3 as a center line that passes through the center section in the width direction of the shoulder belt section 12A in the cross section that is orthogonal to the longitudinal direction. Then, the center line CL in a state that deployment of the inflation section 24 is completed is considered to be positioned on a line that connects center sections in a width direction of the webbings 26 along a tension line, the webbings 26 being positioned on both of the sides in the longitudinal direction with respect to the inflation section 24. The center line CL in the deployed state is configured to be hardly displaced from the center line CL before the inflation of the inflation section 24 due to tension that acts on the shoulder belt section 12A. Thus, the center lines CL before and after the inflation of the inflation section 24 are not particularly distinguished from each other in the following description.

In this embodiment, as shown in FIG. 3A, the inflation section 24 (bag) is configured such that a peripheral length of a portion to be deployed on the head H side with respect to the center line CL is set longer than a peripheral length of a portion to be deployed on the head opposite side in the cross-sectional view that is orthogonal to the longitudinal direction of the shoulder belt section in the folded state. Accordingly, the inflation section 24 is configured to be inflated and deployed asymmetrically as described above.

More specifically, in the folded state shown in FIG. 3, the inflation section 24 has a middle folded section 24A that is folded inward to the center line CL side from an end on the head H side in the width direction. The middle folded section 24A is configured to be deployed to the head H side with respect to the upper and lower webbings 26, which define the tension line, by the supply of the gas to the inflation section 24. Meanwhile, the inflation section 24 has no middle folded section or folded back section on the head opposite side.

Thus, in the inflation section 24, the peripheral length on the head H side is longer than the peripheral length on the head opposite side mainly by a peripheral length of the middle folded section 24A.

For example, in an example of folding shown in FIG. 3A, when the inflation section 24 (shoulder belt section 12A) in the folded state has a width W, the peripheral length on the head opposite side with respect to the center line CL is twice a half of the width W (W/2), and thus is about W. Meanwhile, the peripheral length on the head H side is about 2W, which is obtained by adding about W, which is twice the half of the width W (W/2) of the middle folded section, to the same peripheral length W as that on the head opposite side.

Then, an end on the head H side in the width direction of the inflation section 24, that is, a base end 24B of the middle folded section 24A is sewn at a tear seam 34, so that the folded state is maintained. The tear seam 34 is configured to be torn by inflation pressure of the inflation section 24, which is generated by the supply of the gas from the gas supply device 28.

The pretensioner mechanism 16A of the retractor 16 and the inflator 30 of the gas supply device 28, which constitute the air belt device 10, are each electrically connected to a collision ECU 36 as a control unit. In addition, a collision sensor 38 is electrically connected to the collision ECU 36. The collision ECU 36 is configured to actuate the pretensioner mechanism 16A of the retractor 16 and the inflator 30 when detecting or predicting a frontal collision (or unavoidableness thereof) of the vehicle V on the basis of a signal from the collision sensor 38. The frontal collision in this embodiment includes, in addition to a full-overlap frontal collision, an off-set frontal collision, a small overlap collision in a mode with a small overlapping quantity in the vehicle width direction (for example, 25% or less of a total width) with another party of collision, an oblique collision that is a collision of the vehicle V from an oblique front side, and the like.

(Operations)

Next, operations of the first embodiment will be described.

In the air belt device 10 that is configured as above, the passenger P who is seated on the vehicle seat 11 pulls out the seat belt 12 from the retractor 16 and engages the tongue plate 22 with the buckle 20. Accordingly, in the air belt device 10, as shown in FIG. 2, the shoulder belt section 12A restrains the upper body of the passenger P to the vehicle seat 11, and the lap belt section 12B restrains the lumbar L of the passenger P to the vehicle seat 11.

When detecting or predicting the frontal collision of the vehicle V on the basis of the signal from the collision sensor 38, the collision ECU 36 actuates the pretensioner mechanism 16A of the retractor 16 and the inflator 30. Accordingly, loosening of the seat belt 12 is removed by the tension, and the seat belt 12 is thus tightly fitted on the passenger P. Meanwhile, once the inflation section 24 starts being inflated by the gas from the inflator 30, the inflation pressure tears the tear seam 34. Then, the inflation section 24 is inflated and deployed in a required shape.

The passenger P is applied with a restraint force to the vehicle seat 11 by the seat belt 12, and thus movement thereof to the front is restricted (interference thereof with a seatback or the like of a front seat is suppressed) by the inflation section 24. In addition, the tension is further added to the shoulder belt section 12A by the inflation and deployment (shortening in the longitudinal direction) of the inflation section 24, and the restraint force to restrain the passenger P to the vehicle seat 11 is increased.

Here, since the inflation section 24 is inflated and deployed to be large on the head H side (to be offset on the head H side) with respect to the center line CL of the shoulder belt section 12A, the head H of the passenger P is effectively protected by the inflation section 24. For example, in a comparative example that does not include the air belt device 10 (inflation section 24), a moving distance of the head H to the front tends to be long in a rear seat or a seat in the second or third row that is not provided with an air bag device for a frontal collision. On the contrary, in the vehicle seat 11 to which the air belt device 10 is applied, the movement of the head to the front (downward to the front) is restricted by the inflation section 24, which is deployed to be large on the head H side. Thus, the head H and a neck of the passenger P are effectively protected against the frontal collision.

In addition, during the small overlap collision or the oblique collision described above, the passenger P moves to a collision side in the vehicle width direction while moving to the front. However, even in such a collision mode, the movement of the head H to the oblique front is effectively suppressed by the inflation section 24 in the inflated and deployed shape that is described above. Thus, also in such a collision mode, the required protection performance of the head H and the neck is secured.

In another comparative example that is configured to include an inflation section that is symmetrically inflated and deployed with respect to the center line CL and that obtains the same protection performance of the head H and the neck as the air belt device 10, necessity to increase a volume of the inflation section is raised. To give further details, in this comparative example, the same volume that can be obtained by the inflated and deployed shape of the inflation section 24 on the head H side with respect to the center line CL is requested for the head opposite side with respect to the center line CL. Thus, the volume of the inflation section is increased.

On the other hand, in the air belt device 10, while the inflation section 24 is inflated to be large on the head H side with respect to the center line CL and secures the protection performance of the head H, a volume of the inflation on the head opposite side with respect to the center line CL is small. Thus, compared to the comparative example described above, a total volume of the inflation section 24 can be suppressed to be small.

As described above, in the air belt device 10 according to the first embodiment, it is possible to secure the protection performance of the head H of the passenger P while suppressing an increase in the volume of the inflation section 24. In addition, since the volume of the inflation section 24 can be suppressed, this contributes to shortening of a time until completion of deployment of the inflation section 24 and to a reduced capacity of the inflator 30.

In the inflation section 24, the peripheral length of the portion that is inflated on the head H side with respect to the center line CL (webbing 26) in the cross-sectional view that is orthogonal to the longitudinal direction is longer than the peripheral length of the portion that is deployed on the head opposite side. In addition, the inflation section 24 is folded to achieve just as described. Thus, the inflation section 24 is inflated and deployed in an asymmetrical shape described above with a simple configuration in which the gas is supplied to the inflation section 24 as a single bag.

Since the inflation section 24 is formed with the middle folded section 24A, a difference in the peripheral length is set between the portion on the head H side and the portion on the head opposite side with respect to the center line CL. Compared to a configuration that is not provided with the middle folded section, the inflated section is deployed to be larger on the head side at least by the peripheral length of the middle folded section when the middle folded section 24A is unfolded. Furthermore, compared to other folded modes such as a folded back section, the middle folded section 24A is rapidly unfolded by the supply of the gas to the inflation section 24. Thus, the inflation and deployment of the inflation section 24, which is formed with the middle folded section 24A, are completed in a short time from the supply of the gas. Moreover, since the folding of the middle folded section 24A is retained by the tear seam 34, the shoulder belt section 12A can be configured by the inflation section 24 that is the bag and a different component from the webbing 26.

The Other Embodiments

The other embodiments of the present invention will hereinafter be described. Here, components that are basically the same as those in the above-described embodiment are denoted by the same reference numerals as those in the above-described embodiment. Thus, the description and illustration thereof may not be repeated.

Second Embodiment

Figure 4A:
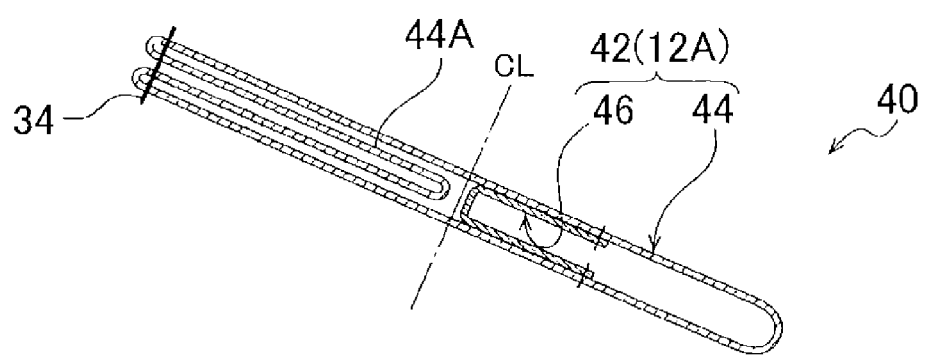
FIG. 4A is a view that shows an inflation section that constitutes an air belt device according to a second embodiment of the present invention, and is an enlarged cross-sectional view that corresponds to FIG. 3A.
Figure 4B:
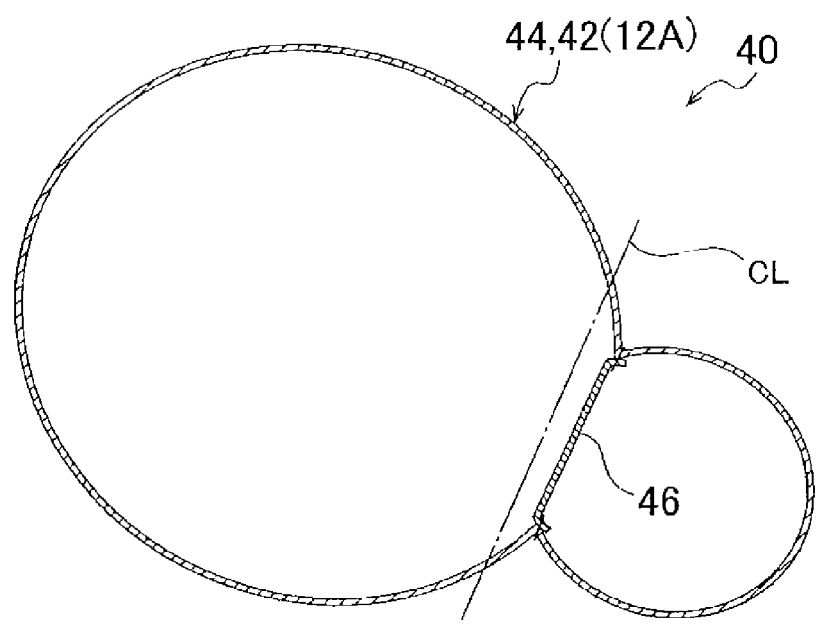
FIG. 4B is a view that shows the inflation section that constitutes the air belt device according to the second embodiment of the present invention, and is an enlarged cross-sectional view that corresponds to FIG. 3B.

In FIG. 4A and FIG. 4B, an inflation section 42 that constitutes an air belt device 40 according to a second embodiment is shown in enlarged cross-sectional views that respectively correspond to FIG. 3A and FIG. 3B. As shown in these drawings, the inflation section 42 is configured by including a bag 44 and a tether 46 that is provided in the bag 44. The bag 44 has a middle folded section 44A that is configured similarly to the middle folded section 24A in the inflation section 24, and is configured similarly to the inflation section 24.

The tether 46 is configured to be provided on the head opposite side with respect to the center line CL in a folded state of the bag 44 shown in FIG. 4A and to restrict an inflation thickness of a portion on the head opposite side in the bag 44 in an inflated and deployed state shown in FIG. 4B. In this embodiment, the tether 46 is sewn on and joined to base clothes, so as to connect between the base clothes that face each other in the folded state of the bag 44. Other configurations of the air belt device 40 are the same as those corresponding to the air belt device 10, including unillustrated portions.

Thus, by performing the same operations as those of the air belt device 10 according to the first embodiment, the same effects as those obtained by the air belt device 10 can basically be obtained by the air belt device 40 according to the second embodiment. In addition, since the tether 46 restricts the inflation thickness of the portion on the head opposite side with respect to the center line CL in the bag 44 of the air belt device 40, the volume of the inflation section 42 (bag 44) can further be suppressed to be small.

Third Embodiment

Figure 5A:
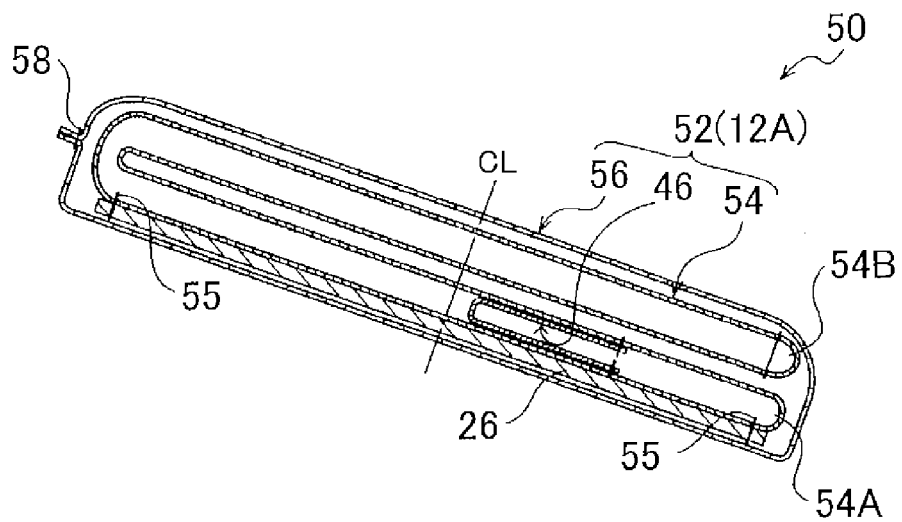
FIG. 5A is a view that shows an inflation section that constitutes an air belt device according to a third embodiment of the present invention, and is an enlarged cross-sectional view that corresponds to FIG. 3A.
Figure 5B:
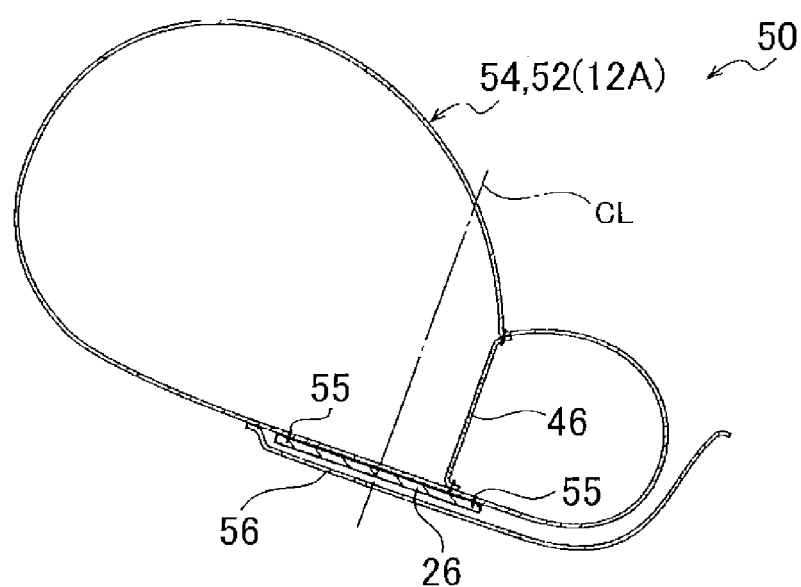
FIG. 5B is a view that shows the inflation section that constitutes the air belt device according to the third embodiment of the present invention, and is an enlarged cross-sectional view that corresponds to FIG. 3B.

In FIG. 5A and FIG. 5B, an inflation section 52 that constitutes an air belt device 50 according to a third embodiment is shown in enlarged cross-sectional views that respectively correspond to FIG. 3A and FIG. 3B. As shown in these drawings, the inflation section 52 differs from the first and second embodiments in a point that the inflation section 52 does not connect between the separated webbings 26 but is provided in the webbing 26 that constitutes the seat belt 12. In other words, the seat belt 12 in this embodiment is configured by having the webbing 26 that is continuous from the anchor plate 14 to the retractor 16.

The inflation section 52 is configured by including a bag 54 that is held by the webbing 26, the tether 46, and a cover member 56. In a folded state as shown in FIG. 5A, the bag 54 has: a base section 54A that is joined to and held by the webbing 26 in a sewn section 55; and a folded back section 54B that is folded back from the head side to the head opposite (center line CL) side and superposed on the base section 54A. On the head opposite side with respect to the center line CL, the tether 46 connects between base clothes that face each other in the base section 54A.

Together with the webbing 26, the cover member 56 covers a whole periphery of the bag 54 that contains the tether 46 and that is folded as described above. The cover member 56 in this embodiment is Rimed of a stretchable mesh webbing, and an end thereof on the head H side is sewn at a tear seam 58 as a torn section. Accordingly, the cover member 56 is shaped in a bag that, together with the webbing 26, covers the whole periphery of the bag 54 as described above. The tear seam 58 is torn by inflation pressure of the bag 54.

Accordingly, the inflation section 52 is inflated and deployed as shown in FIG. 5B by a supply of the gas to the bag 54. More specifically, once the inflation of the bag 54 is started by the supply of the gas, the torn section of the cover member 56 is torn. Then, the inflation section 52 is inflated and deployed while folding of the folded back section 54B is unfolded. In the bag 54 that has the folded back section 54B as described above, a peripheral length thereof on the head H side is longer than a peripheral length on the head opposite side by a peripheral length of the folded back section 54B, and thus, a portion thereof on the head H side is deployed to be larger than a portion thereof on the head opposite side. Other configurations of the air belt device 50 are the same as those corresponding to the air belt device 10, including unillustrated portions.

Thus, by performing the same operations as those of the air belt device 10 according to the first embodiment, the same effects as those obtained by the air belt device 10 can basically be obtained by the air belt device 50 according to the third embodiment, except for the operation and the effect of the rapid inflation and deployment by the middle folded section 24A.

Modified Example

The example in which the inflation section 52 has the tether 46 is shown in the third embodiment. However, the present invention is not limited thereto. For example, the inflation section 52 may adopt a configuration that is not provided with the tether 46.

The example in which the bag 54 has the folded back section 54B is shown in the third embodiment. However, the present invention is not limited thereto. For example, the bag 54 may adopt a configuration that is provided with a middle folded section. Furthermore, a configuration may be adopted that the folded back section 54B is provided with the middle folded section.

In the first and second embodiments described above, the examples in which the inflation sections 24, 42 are configured as the bag itself or by including the bag 44 that contains the tether 46 are shown. However, the present invention is not limited thereto. For example, the inflation sections 24, 42 may each adopt a configuration in which the bag is covered by the cover member 56 or the like. In this configuration, instead of the configurations provided with the middle folded sections 24A, 44A, the inflation section 24 and the bag 44 each adopt a configuration that is provided with a folded back section. In this modified example and the third embodiment, the cover member 56 is not limited to be formed of the mesh webbing. For example, the cover member may be formed of a non-stretchable cloth material.

In each of the above embodiments described above, the examples are shown in which the inflation section 24 and the bags 44, 54 only have the middle folded sections 24A, 44A and the folded back section 54B, which are deployed on the head H side, respectively. However, the present invention is not limited thereto. Any configuration can be adopted for each of the inflation section 24 and the bags 44, 54 as long as the peripheral length of the portion that is deployed on the head H side with respect to the center line CL is longer than the peripheral length of the portion that is deployed on the head opposite side in the cross-sectional view that is orthogonal to the longitudinal direction. Each of the inflation section 24 and the bags 44, 54 may adopt a configuration that is provided with a middle folded section or a folded back section on the head opposite side.

Needless to say, the length of each of the middle folded sections 24A, 44A, the number of folding thereof, the length of the folded back section, and the number of folding thereof are not limited to those in the above embodiments (illustrated examples).

In each of the embodiments described above, the example in which the gas supply device 28 has the inflator 30 arranged on the anchor plate 14 side and the flexible hose 32 is shown. However, the present invention is not limited thereto. For example, a configuration may be adopted that an inflator is arranged on the buckle 20 side and that gas is supplied to the inflation sections 24, 42, 52 through a gas passage that is communicated and sealed by the engagement of the buckle 20 and the tongue plate 22.

In each of the embodiments described above, the example in which each of the air belt devices 10, 40, 50 is applied to the rear seat, the second-row seat, or the third-row seat. However, the present invention is not limited thereto. For example, each of the air belt devices 10, 40, 50 may be applied to a driver seat or a passenger seat.

In each of the embodiments described above, the example in which the pretensioner mechanism 16A of the retractor 16 or the pretensioner mechanism on the buckle 20 side is provided is shown. However, the present invention is not limited thereto. For example, a configuration may be adopted that the pretensioner mechanism that pulls the seat belt 12 from the end in the longitudinal direction is not provided. Also in the configuration according to the modified example, a pretensioner function can be achieved by shortening of the shoulder belt section 12A in conjunction with the inflation and deployment of each of the inflation sections 24, 42, 52.

Needless to say, in addition to the above, various modifications can be made to practice the present invention without departing from the gist thereof.

What is claimed is:

1. An air belt device comprising:
a shoulder belt section that is worn from a shoulder on one side in a seat width direction of a passenger who is seated on a seat to a lumbar on another side in the seat width direction, wherein
the shoulder belt section includes an inflation section that is inflated by a supply of gas and in which a portion on a head side of the passenger with respect to a center section in a width direction of the shoulder belt section is deployed to be larger than a portion on an opposite side from the head side,
the inflation section includes a tether that restricts an inflation thickness more on the opposite side from the head side than on the head side, and the tether is provided on the head opposite side with respect to a center line in a folded state of a bag and connects between base clothes that face each other.

2. The air belt device according to claim 1, wherein
both ends in a longitudinal direction of the inflation section are each joined to a webbing that functions as a non-inflation section of the shoulder belt section such that the inflation section constitutes a portion in a longitudinal direction of the shoulder belt section.

3. The air belt device according to claim 1, wherein
the inflation section is provided on a webbing that constitutes the shoulder belt section.

4. The air belt device according to claim 1, wherein
the shoulder belt section is provided in a rear seat in a two-row seat layout or in a second-row or third-row seat in a three-row seat layout.

5. The air belt device according to claim 1, wherein
the inflation section includes the bag that is inflated from the folded state by the supply of the gas, and
a peripheral length of a portion of the bag that is deployed on the head side with respect to the center section in the width direction of the shoulder belt section is longer than a peripheral length of a portion thereof that is deployed on the opposite side from the head side with respect to the center section in the width direction of the shoulder belt section in a cross-sectional view that is orthogonal to a longitudinal direction of the shoulder belt section in the folded state.

6. The air belt device according to claim 5, wherein
the bag has a folded back section that is folded back to a center side in the width direction of the shoulder belt section from the head side, and
the inflation section includes a cover member that covers the bag and has a torn section in which a portion in a peripheral direction is torn by inflation pressure of the bag.

7. The air belt device according to claim 5, wherein
the tether extends in the longitudinal direction of the shoulder belt section, and is provided with the folded state on the head opposite side with respect to the center section.

8. The air belt device according to claim 5, wherein
the bag has a middle folded section that is folded inward to a center side in the width direction of the shoulder belt section from the head side.

9. The air belt device according to claim 8, wherein
an end on the head side that includes the middle folded section is sewn at a tear seam that is torn by inflation pressure of the bag.

10. An air belt device comprising:
a shoulder belt section that is worn from a shoulder on one side in a seat width direction of a passenger who is seated on a seat to a lumbar on another side in the seat width direction, wherein
the shoulder belt section includes an inflation section that is inflated by a supply of gas and in which a portion on a head side of the passenger with respect to a center section in a width direction of the shoulder belt section is deployed to be larger than a portion on an opposite side from the head side,
the inflation section includes a bag that is inflated from a folded state by the supply of the gas and a tether that restricts an inflation thickness on the opposite side from the head side,
a peripheral length of a portion of the bag that is deployed on the head side with respect to the tether in the width direction of the shoulder belt section is longer than a peripheral length of a portion thereof that is deployed on the opposite side from the head side with respect to the tether in the width direction of the shoulder belt section in a cross-sectional view that is orthogonal to a longitudinal direction of the shoulder belt section in the folded state, the bag has a middle folded section that is folded inward to a center side in the width direction of the shoulder belt section from the head side, and an end on the head side that includes the middle folded section is sewn at a tear seam that is torn by inflation pressure of the bag.

11. An air belt device comprising:

a shoulder belt section that is worn from a shoulder on one side in a seat width direction of a passenger who is seated on a seat to a lumbar on another side in the seat width direction, wherein the shoulder belt section includes an inflation section that is inflated by a supply of gas and in which a portion on a head side of the passenger with respect to a center section in a width direction of the shoulder belt section is deployed to be larger than a portion on an opposite side from the head side, the inflation section includes the bag that is inflated from the folded state by the supply of the gas, a peripheral length of a portion of the bag that is deployed on the head side with respect to the center section in the width direction of the shoulder belt section is longer than a peripheral length of a portion thereof that is deployed on the opposite side from the head side with respect to the center section in the width direction of the shoulder belt section in a cross-sectional view that is orthogonal to a longitudinal direction of the shoulder belt section in the folded state, the bag has a folded back section that is folded back to the center section in the width direction of the shoulder belt section from the head side, the inflation section includes a cover member that covers the bag and has a torn section in which a portion in a peripheral direction is torn by inflation pressure of the bag, a tether is provided entirely on the opposite side from the head side with respect to a center line in a folded state of a bag and connects between base clothes that face each other, and the inflation section is provided on a webbing that constitutes the shoulder belt section.

12. An air belt device comprising:

a shoulder belt section that is worn from a shoulder on one side in a seat width direction of a passenger who is seated on a seat to a lumbar on another side in the seat width direction, wherein the shoulder belt section includes an inflation section that is inflated by a supply of gas and in which a portion on a head side of the passenger with respect to a center section in a width direction of the shoulder belt section is deployed to be larger than a portion on an opposite side from the head side, the inflation section includes the bag that is inflated from the folded state by the supply of the gas, a peripheral length of a portion of the bag that is deployed on the head side with respect to the center section in the width direction of the shoulder belt section is longer than a peripheral length of a portion thereof that is deployed on the opposite side from the head side with respect to the center section in the width direction of the shoulder belt section in a cross-sectional view that is orthogonal to a longitudinal direction of the shoulder belt section in the folded state, the bag has a middle folded section that is folded inward to a center side in the width direction of the shoulder belt section from the head side, the middle folded section is provided entirely on the head side with respect to a center line in a folded state of the bag, an end on the head side that includes the middle folded section is sewn at a tear seam that is torn by inflation pressure of the bag, and the end on the head side is sewn at the tear seam in the longitudinal direction of the shoulder belt section.

13. An air belt device comprising:

a shoulder belt section that is worn from a shoulder on one side in a seat width direction of a passenger who is seated on a seat to a lumbar on another side in the seat width direction, wherein the shoulder belt section includes an inflation section that is inflated by a supply of gas and in which a portion on a head side of the passenger with respect to a center section in a width direction of the shoulder belt section is deployed to be larger than a portion on an opposite side from the head side, the inflation section includes a bag that is inflated from a folded state by the supply of the gas, a peripheral length of a portion of the bag that is deployed on the head side with respect to the center section in the width direction of the shoulder belt section is longer than a peripheral length of a portion thereof that is deployed on the opposite side from the head side with respect to the center section in the width direction of the shoulder belt section in a cross-sectional view that is orthogonal to a longitudinal direction of the shoulder belt section in the folded state, the bag has a middle folded section that is folded inward to a center side in the width direction of the shoulder belt section from the head side, and the inflation section has no middle folded section or folded back section on the head opposite side.

* * * * *